United States Patent
Zhu

(10) Patent No.: US 9,239,863 B2
(45) Date of Patent: Jan. 19, 2016

(54) METHOD AND APPARATUS FOR GRAPHIC CODE DATABASE UPDATES AND SEARCH

(71) Applicant: Alibaba Group Holding Limited, Grand Cayman (KY)

(72) Inventor: Chen Zhu, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 339 days.

(21) Appl. No.: 14/035,788

(22) Filed: Sep. 24, 2013

(65) Prior Publication Data
US 2014/0089340 A1     Mar. 27, 2014

(30) Foreign Application Priority Data
Sep. 27, 2012    (CN) .......................... 2012 1 0369623

(51) Int. Cl.
*G06F 17/30*     (2006.01)

(52) U.S. Cl.
CPC .... *G06F 17/30424* (2013.01); *G06F 17/30879* (2013.01)

(58) Field of Classification Search
CPC ...................... G06F 17/30423; G06F 17/30879
USPC ......................................................... 707/769
See application file for complete search history.

(56) References Cited

U.S. PATENT DOCUMENTS

| | | | | |
|---|---|---|---|---|
| 6,775,409 B1 * | 8/2004 | Brunelli | ................... | G06K 7/14 382/170 |
| 8,073,255 B2 * | 12/2011 | Nishikawa | ........ | G06F 17/30247 382/177 |
| 8,407,199 B2 * | 3/2013 | Kritt | ................. | G06F 17/30643 707/706 |
| 8,666,817 B2 * | 3/2014 | DeRoller | ........... | G06Q 30/0251 270/52.02 |
| 8,682,924 B2 * | 3/2014 | Tao | ...................... | G06F 17/3053 707/769 |
| 2002/0125313 A1 * | 9/2002 | Broff | ..................... | G06Q 30/02 235/383 |
| 2004/0006494 A1 * | 1/2004 | Badinelli | .............. | G06F 19/324 705/2 |
| 2006/0218522 A1 | 9/2006 | Hanechak | | |
| 2007/0214155 A1 | 9/2007 | Chang et al. | | |
| 2009/0031224 A1 | 1/2009 | Budreau | | |
| 2009/0292686 A1 | 11/2009 | Carter et al. | | |
| 2011/0218994 A1 | 9/2011 | Holladay et al. | | |
| 2011/0314016 A1 | 12/2011 | Svendsen | | |

(Continued)

OTHER PUBLICATIONS

14035788_STIC_NPL_article1 : W.Bruce Croft, Donald Metzler Title : Search engines informatiomn retrieval in practice. 06-11-09P 12:15 RCVO, Copyright @ 2010 (pp. 6, 24, 25 and 220).*

(Continued)

*Primary Examiner* — Rehana Perveen
*Assistant Examiner* — Hicham Skhoun
(74) *Attorney, Agent, or Firm* — Lee & Hayes, PLLC

(57) ABSTRACT

Methods and apparatuses for updating and searching a graphic code are disclosed. The apparatus receives a graphic query request carrying a graphic code to be searched. If no product information corresponding to the graphic code is found in the graphic code database, the apparatus searches for a recommended keyword corresponding to the graphic code; if a recommended keyword is found, the apparatus returns the recommended keyword, and if not found, returns a search box. The apparatus then receives a search request carrying a search keyword, and, if the search keyword is determined to be inconsistent with the recommended keyword corresponding to the graphic code, makes the search keyword a new recommended keyword of the graphic code, and adds the new recommended keyword to the graphic code database.

20 Claims, 10 Drawing Sheets

(56) References Cited

U.S. PATENT DOCUMENTS

| | | | |
|---|---|---|---|
| 2012/0057186 A1 | 3/2012 | Matsui | |
| 2012/0158691 A1* | 6/2012 | Yang | G06F 17/30722 707/706 |
| 2012/0323930 A1* | 12/2012 | Kennberg | H04L 63/101 707/748 |
| 2013/0054623 A1 | 2/2013 | Chang | |
| 2013/0290320 A1* | 10/2013 | Zhu | G06F 17/30861 707/723 |
| 2014/0367464 A1* | 12/2014 | Herzig | G06K 1/121 235/375 |

OTHER PUBLICATIONS

14035788_STIC_NPL_article2 : Authors et. al.: IBM, Title : Sideband Signaling for Enhanced Optical Barcode Communications, Original Publication Date: Sep. 10, 2009, IP.com No. IPCOM000187540D, IP.com Electronic Publication: Sep. 10, 2009.*

PCT Search Report and Written Opinion mailed Jun. 4, 2014 for PCT Application No. PCT/US13/61474, 10 Pages.

* cited by examiner

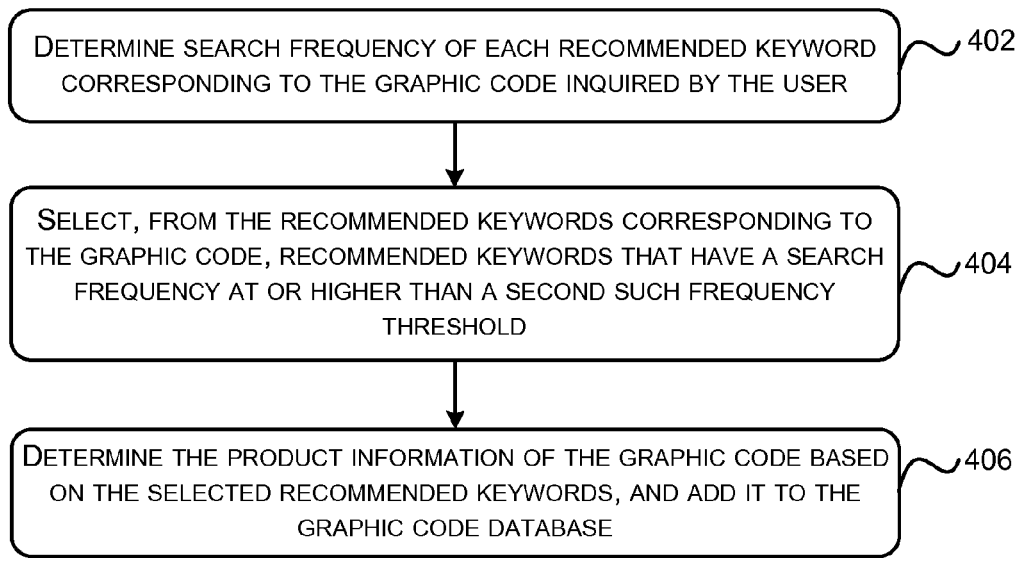
Fig. 4
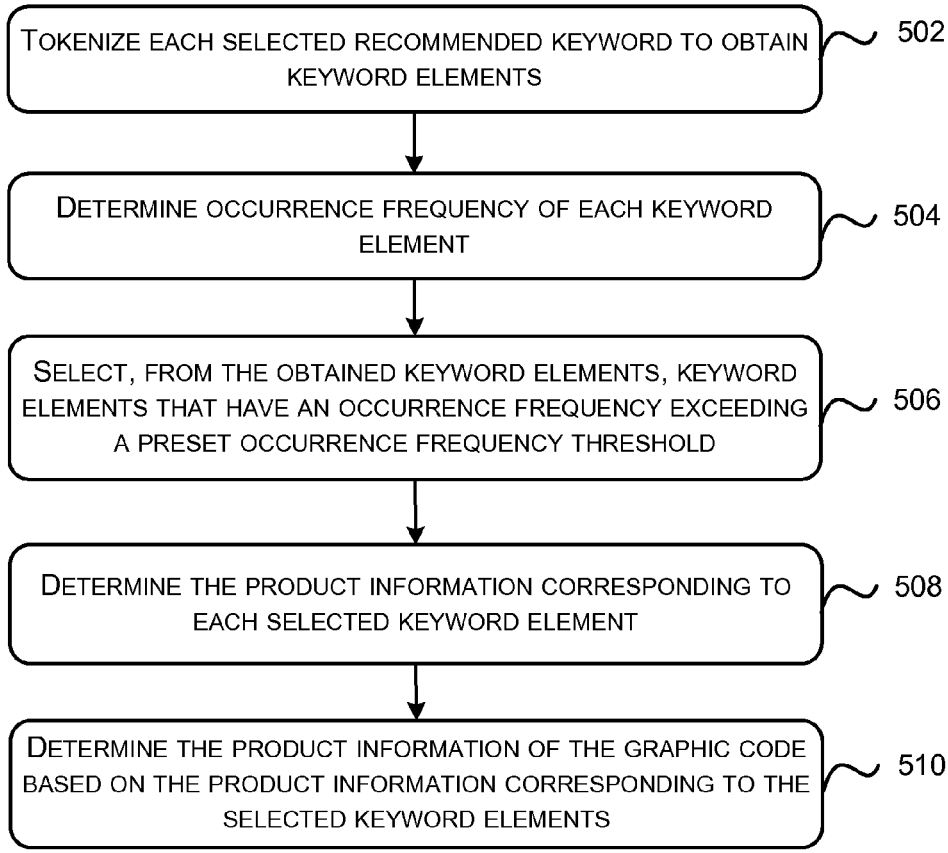
Fig. 5.1

Fig. 5.2

METHOD AND APPARATUS FOR GRAPHIC CODE DATABASE UPDATES AND SEARCH

CROSS REFERENCE TO RELATED PATENT APPLICATIONS

This application claims foreign priority to Chinese Patent Application No. 201210369623.7 filed on Sep. 27, 2012, entitled "Method and Apparatus for Updating and Querying Graphic Code Database," which is hereby incorporated by reference in its entirety.

TECHNICAL FIELD

This application relates to the field of data processing technology, in particular to graphic code database updates, query methods and related devices.

BACKGROUND

Graphic code is capable of carrying product information in barcodes, 2D codes, pictures and other encoded pictures. A graphic code of a product can uniquely identify the product. A graphic product code database is a database for the storage of graphic codes of products and product information.

With the development of mobile terminal technology, smart mobile devices with a camera are growing in popularity. Users can use a camera of a smart mobile device to scan graphic codes of products and submit the scanned graphic codes to graphic code lookup servers on the network side. Using the graphic product code received from a mobile terminal, the graphic code lookup server finds corresponding product information in a graphic code database, and returns the found product information to the mobile terminal, which displays the received product information to a user, who may then compare products and make a purchase based on the product information displayed on the mobile terminal.

A graphic product code database is a dynamic data set. Because different manufacturers constantly make new products that have new graphic codes, a complete and constantly updated graphic product code database is required in order to support search for graphic product codes and product identifications.

Existing technologies primarily use the following methods to update a graphic code database: upon receiving a graphic product code submitted by a user through a mobile terminal, if a graphic code lookup server on the network side fails to find any product information corresponding to the received graphic code in the graphic product code database, the server records the received graphic code, and subsequently uses manual lookup by backend management personnel to find product information corresponding to the received graphic code and add the found product information to the graphic code database.

Due to the rapid pace of product announcements and updates and resultant massive product data, the above described manual updating method of graphic product code database requires a huge amount of labor and results in low efficiency, unable to cope with the growing demands for timely updated massive product information.

Furthermore, if the graphic code lookup server code fails to find in the graphic code database product information corresponding to the graphic code, it returns a search failure notification to the user. The user may have to abandon the graphic code and turn to a different method to search for the product information. For example, the user may have to open a search application on the mobile terminal to search for the product information. This operation not only consumes more computing resources of the mobile terminal, but also makes the process of searching for product information cumbersome, resulting in poor user experience, and low flexibility of product information search.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

Embodiments of this application provide methods and related apparatuses for updating and searching a graphic code database for the purpose of addressing the problems of existing techniques, such as too much consumption of computing resources of a terminal device, cumbersome processes of searching for product information, and low flexibility. The embodiments of this application entail various technical solutions described below.

In one embodiment, a method for updating a graphic code database has the following steps. An apparatus receives from a user a graphic code query request which includes a graphic code to be searched; if no product information corresponding to the graphic code is found in graphic code database, the apparatus searches whether a recommended keyword corresponding to the graphic code is present in the graphic code database; if at least one recommended keyword is found, the apparatus returns the recommended keyword corresponding to the graphic code along with a search box; if no recommended keyword is found, it returns the search box only. The apparatus further receives a search query carrying a search keyword, which is either selected by the user from the returned recommended keyword or entered through the search box; and if the search keyword does not match any recommended keyword corresponding to the graphic code, the apparatus makes the search keyword a new recommended keyword corresponding to the graphic code to be searched, and adds the new recommended keyword to the graphic code database.

In another embodiment, a method for searching a graphic code database has the following steps. An apparatus first updates the graphic code database using a method as described above. The apparatus then receives another graphic code query request which includes the graphic code to be searched, searches the graphic code database to find the updated product information corresponding to the graphic code, and returns the product information found.

Another embodiment concerns an apparatus for updating a graphic code database. The apparatus includes: a graphic code query request receiving unit, for receiving a graphic code query request carrying a graphic code to be searched; a product information inquiry unit, for finding whether product information corresponding to the graphic code is contained in a graphic code database; a recommended keyword query unit, for finding, when the product information corresponding to the graphic code is not found in the graphic code database, whether a recommended keyword corresponding to the graphic code is contained in the graphic code database; a returning unit, for returning the recommended keyword corresponding to the graphic code and a search box for receiving a search keyword, or for returning the search box for receiving the search keyword when the recommended keyword query unit finds no recommended keyword; a search request receiving unit, for receiving a search request carrying a search keyword, which is either selected by the user from the returned recommended keyword, or an input search keyword entered through the search box; a keyword determining unit, for determining whether the search keyword matches the recommended keyword corresponding to the graphic code; and a keyword determining and adding unit, for, when the search keyword is determined to not match the recommended keyword corresponding to the graphic code, making the search keyword a new recommended keyword corresponding to the graphic code, and adding the new recommended keyword to the graphic code database.

Yet another embodiment is an apparatus for searching a graphic code database. The apparatus includes: a graphic code query request receiving unit, for receiving a graphic code query request carrying a graphic code to be searched; a product information lookup unit, for finding, in a graphic code database which is updated using the method described above, product information corresponding to the graphic code; and a product information returning unit, for returning product information found by the product information lookup unit.

According to an embodiment of the method for updating a graphic code database, upon receiving a query request containing a graphic code to be searched, the apparatus searches in the graphic code database for product information corresponding to the received graphic code. When the graphic code database does not have any product information corresponding to the graphic code searched by the user, the apparatus continues to search for a recommended keyword corresponding to the graphic code. If a recommended keyword is found, the apparatus returns both the recommended keyword and a search box; and if not found, it just returns the search box. The search box is used by the user to enter a search keyword in order to find the product information corresponding to the graphic code. The user may choose one of the recommended keywords as the search keyword to search the product information corresponding to the graphic code, or may separately enter a custom search keyword to search the product information corresponding to the graphic code. Upon receiving a search request containing the search keyword, if the received search keyword is different from the recommended keyword corresponding to the graphic code, the apparatus may take the received search keyword to be the recommended keyword corresponding to the graphic code, and add the new recommended keyword into the graphic code database. As such, according to the disclosed embodiments, if the graphic code database does not contain product information corresponding to the graphic code, the apparatus no longer just returns a search failure notification like prior art techniques do, but instead returns the search box with recommended keywords, such that the user no longer needs to open a search application in the terminal device to do a separate keyword-based search, but may use the returned recommended keywords and the search box to directly search for the relevant product information. This helps to save processing resources at the terminal device, simplifies the process of searching product information, improves user experience, and results in better flexibility.

Other features of the present application and advantages will be set forth in the following description, and in part will become clear from the description, or understood by practice of the disclosed embodiments. Purposes of this disclosure and other advantages can be achieved or obtained by the written description, claims, and drawings of the structures as illustrated.

BRIEF DESCRIPTION OF THE DRAWINGS

FIG. 4 is a flow diagram of a process of determining product information based on a recommended keyword corresponding to a graphic code, in accordance with a second embodiment of the present application.

FIG. 5-1 is a flow diagram of a process of determining product information based on keyword elements obtained by tokenization, in accordance with the second embodiment of the present application.

FIG. 5-2 is a flow diagram of a process of determining product information based on attribute values of product attributes, in accordance with the second embodiment of the present application.

DETAILED DESCRIPTION

The specification of the present application will be described in the following with preferred embodiments and references to the drawings. It should be understood that the preferred embodiments described herein are illustrative only in order to explain the present application, and are not intended to limit the present application. Furthermore, the embodiments of the present application and features of the embodiments can be combined freely with each other unless there is inherent conflict.

Figure 1:
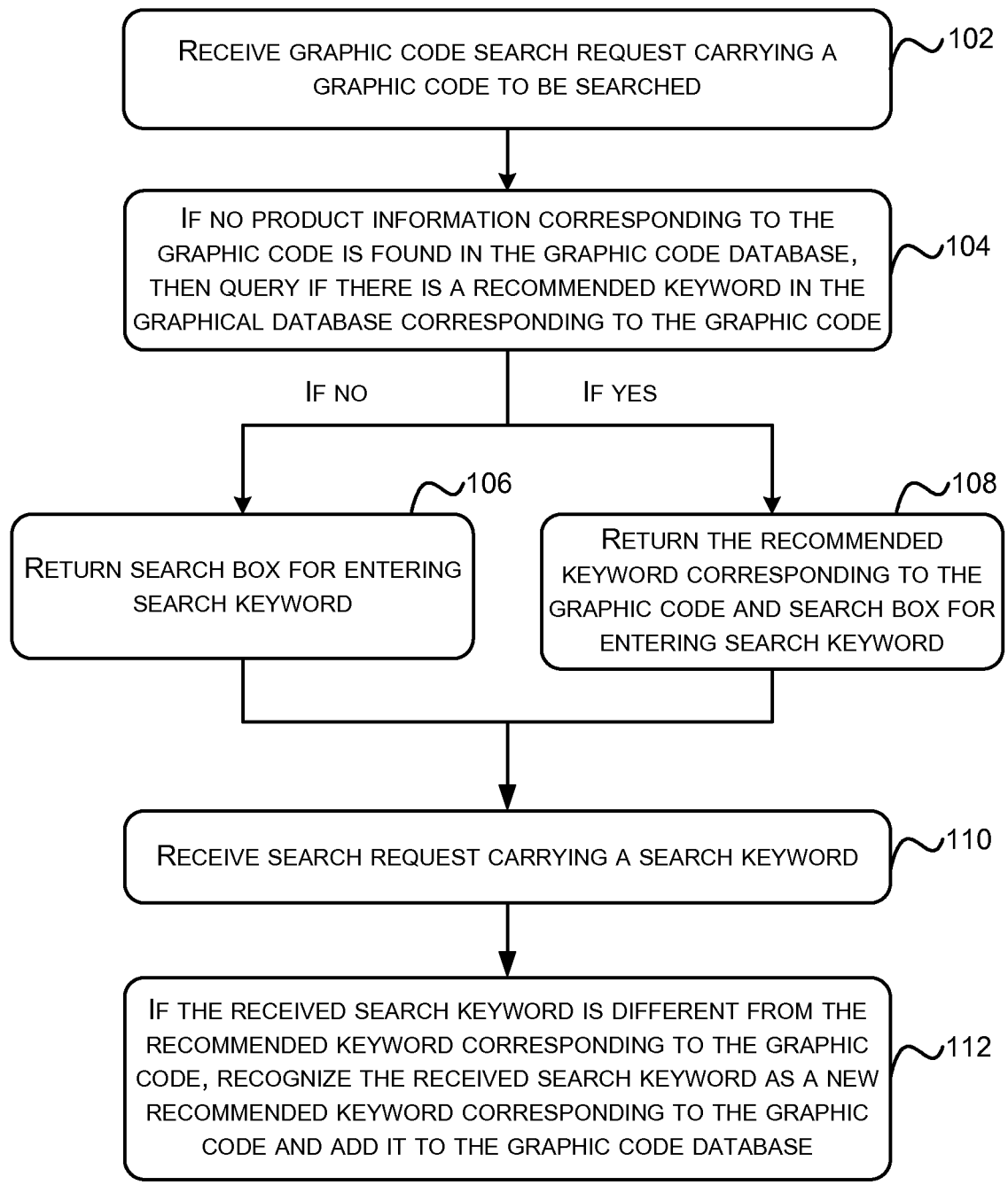
FIG. 1 is a flow diagram of a method for updating a graphic code database, in accordance with a first embodiment of this application.

FIG. 1 shows a flow diagram of a process of updating a graphic code database in accordance with a first embodiment of the present application. The specific process is as follows:

102 is to receive a graphic code request carrying a graphic code to be searched.

The embodiment of the present application relates to a graphic code that may be able to carry product information in barcodes, 2D codes, pictures, etc., which can be read using a reading device in order to obtain product information carried by the graphic code. The graphic code is capable to uniquely represent and thus uniquely identify a corresponding product.

The graphic code database is used for storing graphic codes of products and corresponding product information. Users may easily find product information corresponding to a graphic code stored in the graphic code database, and use it for subsequent comparison and purchase of a product.

To obtain product-specific information, the user may use an image acquisition device of a terminal device to scan the graphic code of the product. The terminal device packages the acquired graphic code into a graphic code inquiry request and sends the request to a graphic code lookup server to find the product information corresponding to the graphic code.

The image acquisition device may be, but not limited to, a camera, or graphic code scanner. Terminal devices mentioned in the embodiments of the present application can be a mobile device, but can also be a personal computer (PC).

For example, before buying a product, a user may want to check out the sale price of the product on an e-commerce site. The user can use the camera of a carried portable device to scan the bar code of the product (e.g., [6947329487546]), and let the device package the scanned bar code into a graphic code query request to be sent to the graphic code lookup server.

At 104, if the graphic code database does not have the product information corresponding to the received graphic code, the server queries whether the graphic code database has a recommended keyword corresponding to the graphic code. If the query result is negative, the process goes to 106; if the query result is positive, the process goes to 108.

Most specifically, according to an embodiment of the present application, upon receiving a graphic code inquiry request, the graphic code lookup server first determines whether the graphic code database stores the product information corresponding to the graphic code carried in the search request. If the database stores such product information, the server directly returns the product information, and ends the process. If the graphic code database does not store such product information, the server continues to query whether the database has a recommended keyword corresponding to the graphic code.

In the existing technology, if the graphic code database does not have the product information corresponding to the graphic code searched by the user, the graphic code lookup server would only return a search failure notification to the user. The user will have to open a search application on the terminal device, and enter a search keyword in the opened search application in order to search for product information corresponding to the graphic code. In view of this, in accordance with this embodiment of the present application, the process for the user to search product information in an event where the graphic code database does not have the product information corresponding to the desired graphic code is simplified by automatically providing the user recommended keywords and a search box.

As will be shown below, the user is also allowed to modify the recommended keywords or enter custom search keywords manually. The graphic code lookup server further collects the search keyword modified or entered by the user, treats the collected search keywords as new recommended keywords corresponding to the graphic code, and stores the new recommended keywords into the graphic code database. When subsequent users submit the same graphic code in a query request, the graphic code lookup server provides the collected search keywords to these users as an option to search, thus avoiding a shortcoming of the current technology which is unable to provide an option for the user to refer to in the subsequent search. In this manner, the recommended keywords in the graphic code database is constantly updated, making the collected keywords in the graphic code database able to more accurately represent the graphic codes, and improving the accuracy of the corresponding recommended keywords sent back to the users.

As illustrated above, the graphic code database stores not only the corresponding relations between the graphic codes and product information, but also stores corresponding relations between recommended keywords and those graphic codes that do not have any corresponding product information. Each graphic code may correspond to at least one recommended keyword.

106 is to return a search box for entering search keywords by the user.

If the graphic code database does not have any product information corresponding to the graphic code searched by the user, and also the graphic code is being searched for the first time and as a result the graphic code database has no recommended keywords corresponding to the graphic code either, the graphic code lookup server may return a search box to guide the user to enter a search keyword into the search box to search for the product information. This facilitates automatic updating of the graphic code database. As such, the user no longer needs to reopen the search application on the terminal device in order to search for the product information, but rather may directly use the returned search box to search for the product information. The process effectively saves computing resources at the terminal device, simplifies the product information search process, improves user experience, and increases flexibility of product information search.

Figure 2:
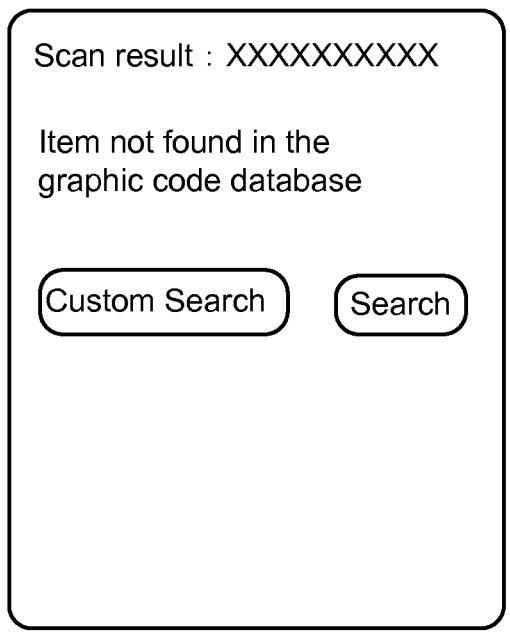
FIG. 2 is an interface schematic of a terminal device in accordance with the first embodiment of this application, wherein the graphic code lookup server returns a search box.

As shown in FIG. 2, the user's terminal device displays the search box returned from the graphic code lookup server so that the user may enter a search keyword to search for the product information.

For example, suppose the graphic code carried in the graphic code inquiry request sent from the user's carried terminal device to the graphic code lookup server is [6947329487546], and the server finds no corresponding product information in the graphic code database. Suppose also this graphic code is being searched by a user for the first time, and as a result no recommended keyword corresponding to the graphic code is found in the database either. With this, the graphic code lookup server returns a search box, which is displayed on the terminal device such that the user may enter a search keyword to search for the product information.

At 108, the server returns one or more recommended keywords corresponding to the graphic code along with a search box for entering a search keyword.

If the graphic code database has a recommended keyword corresponding to the graphic code search by the user, the server may return the recommended keyword to the user, so that the user may simply select one of the returned recommended keywords to directly search for product information without opening a search application separately, nor entering a search keyword. In addition, the graphic code lookup server may also return a search box to the user, so that the user may separately enter a custom search keyword of his choice into the search box, or enter a search keyword by modifying a returned recommended keyword. This allows personalized search by the user.

Figure 3:
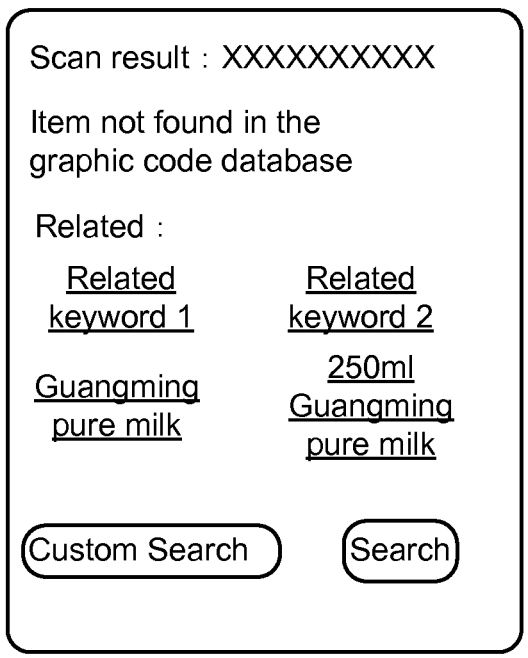
FIG. 3 is an interface schematic of a terminal device in accordance with the first embodiment of this application, wherein the graphic code lookup server returns recommended keywords and a search box.

As shown in FIG. 3, the user's terminal device displays the recommended keyword(s) and the search box returned by the graphic code lookup server.

For example, suppose the graphic code carried in the search request sent from the user's terminal device to the graphic code lookup server is [6947329487546], which has no corresponding product information found in the graphic code database. But because the graphic code database stores recommended keywords "Du Kangzhen wine" and "Du Kangzhen wine 1988" that are corresponding to the graphic code, therefore the graphic code lookup server returns these two recommended keywords to the user's terminal device along with the search box which are displayed to the user by the terminal device. The user modifies the recommended keyword "Du Kangzhen wine" to "52° Du Kangzhen wine" and performs a search.

According to this embodiment, if the graphic code database stores only one recommended keyword corresponding to the graphic code searched by the user, the graphic code lookup server may directly return this recommended keyword to the user's terminal device; but if the graphic code database stores at least two recommended keywords corresponding to the graphic code, the graphic code lookup server may either return every recommended keywords to the user's terminal device, or, in order to improve the accuracy of the returned recommended keywords, selectively return just some of the recommended keywords.

Specifically, graphic code lookup server may first determine a search frequency of each recommended keyword corresponding to the graphic code searched by the user, then select from the recommended keywords those that have a search frequency at or above a first search frequency threshold, and return only the selected recommended keywords to the terminal device of the user.

According to this embodiment, each time when the graphic code lookup server adds a new recommended keyword to the graphic code database, the server starts a counter to record the number of searches performed using this recommended keyword. The counter registers "1" when it is starts to count the first search, and increases by "1" each time when a user search request is received which carries a search keyword that is the same as the recommended keyword in question. Doing this for each recommended keyword, the server gets an accumulative count to determine a respective search frequency for each recommended keyword.

The above described first search frequency threshold may be preset. For example, if the first search frequency threshold is set to be "4" (four times), the graphic code lookup server selects only those corresponding recommended keywords that have a search frequency at or above "4" and return them to the user. If it is desired that the graphic code lookup server should select all recommended keywords corresponding to the graphic code, the first threshold may be sent to "1" (one time).

During a certain period of time, if few users have searched a certain recommended keyword, it may indicate that this recommended keyword is not representative of the product information related to the graphic code, and recommending this keyword may lower the efficiency of finding the relevant product information by users. Accordingly, in this embodiment, the graphic code lookup server may only selectively return some of the recommended keywords selected based on the search frequencies of the recommended keywords instead of returning all of them. This may improve the accuracy of the returned recommended keywords and result in higher efficiency for searching product information by users.

At 110, the server receives a search request carrying a search keyword. The user may have selected a recommended keyword from a list of the recommended keywords returned from the server and use it as a search keyword in the search request, or have entered the user's own search keyword using the search box. The terminal device packages the selected or entered search keyword into the search request and sends the request to the graphic code lookup server.

At 112, when the server has determined that the received search keyword is different from the existing recommended keyword(s) corresponding to the graphic code, it makes the received search keyword a new recommended keyword corresponding to the graphic code, and adds the new recommended keyword to the graphic code database.

More specifically, about receiving the search request carrying a search keyword, the graphic code lookup server compares the received search keyword with each existing recommended keyword that corresponds to the graphic code searched by the user in the graphic code database. If the received search keyword is found to be the same as one of the existing recommended keywords, the server does nothing further with the received search keyword. If the received search keyword is found to be different from all existing recommended keywords, the server treats the received search keyword as a new recommended keyword and adds it to graphic code database. This process enables automatic updating of the recommended keywords in the graphic code database, and ensures that the recommended keywords collected in the graphic code database accurately reflect the relevant product information related to the searched graphic codes for better accuracy of the recommended keywords returned to users.

For example, suppose the graphic code carried in the search request sent by the user through a portable terminal device to the graphic code lookup server is [6947329487546], and the server finds no product the information corresponding to this graphic code. However, because the graphic code database stores two recommended keywords "Du Kangzhen wine" and "Du Kangzhen wine 1988" that correspond to this graphic code, the graphic code lookup server returns these two recommended keywords to the user's terminal device which displays the two received recommended keywords to the user. In the search box, the user modifies "Du Kangzhen wine" to "52° Du Kangzhen wine" and sends a search request carrying the modified search keyword "52° Du Kangzhen wine". The graphic code lookup server compares the received search keyword with the existing recommended keywords "Du Kangzhen wine" and "Du Kangzhen wine 1988" corresponding to the graphic code, and decides that the received search keyword is different from both the existing recommended keywords. As a result, the graphic code lookup server treats "52° Du Kangzhen wine 1988" as a new recommended keyword corresponding to the graphic code [6947329487546] and adds it to the graphic code database.

Accordingly, eight methods for updating a graphic code database in this embodiment of the present application is also described as follows. Upon receiving a search request carrying a graphic code to be searched, the server looks up product information corresponding to the searched graphic code. If no such product information is found, the server may continue to check if there is a recommended keyword corresponding to the searched graphic code. If at least one such recommended keyword is found, the server returns the recommended keyword and the search box to the user. If no recommended keyword is found, the server returns just the search box. The search box is used by the user to enter a search keyword to search product information corresponding to the graphic code. To continue to search for product information corresponding to the graphic code, the user may either choose a recommended keyword from the returned recommended keywords, or enter the user's own search keyword into the search box. Upon receiving from the user a search request carrying the user selected or entered search keyword, if the server finds the received search keyword to be different from existing recommended keyword(s) corresponding to the graphic code, the server makes the received search keyword a new recommended keyword corresponding to the graphic code, and adds it to the graphic code database. Thus, according to the current embodiment, if no product information corresponding to the graphic code is found in the graphic code database, the server does not merely return a search failure notification to the user, but instead returns a search box with recommended keyword(s). The user no longer needs to reopen a search application on the terminal device in order to search for product information, but instead may directly use a returned recommended keyword and/or the search box to perform such search. This effectively saves more computing resources at the terminal device, simplifies the process for the user to search product information, improved user experience, and increases the flexibility of product information search.

The proposed scheme according to this embodiment of the present application shows that if no product information responding to the searched graphic code is found in the database, the server uses a method described herein to update the recommended keywords in the database. The server may further determine the product information corresponding to the graphic code searched by the user, and add the determined product information to the graphic code database to update the product information in the database.

The embodiments of the present application propose two alternate methods for determining the product information corresponding to a graphic code. The first method determines product information based on the recommended keywords corresponding to the graphic code, while the second method determines the product information based on user click rates of the product information returned to the user as a search result. The two methods are described below respectively.

First introduced is the method for determining product information according to the recommended keywords corresponding to the graphic code.

Shown in FIG. 4 is flow diagram of a method for determining product information according to recommended keywords corresponding to a graphic code, in accordance with another embodiment of the present application. The specific process is as follows:

402 is to determine a search frequency for each recommended keyword corresponding to the graphic code being searched.

The graphic code lookup server has a counter that accounts the number of times users have searched using each recommended keyword. Each time when the server adds a new recommended keyword to the graphic code database, the server starts a counter to record the number of searches that have been performed using this recommended keyword. The counter registers "1" when it is started at the first search, and increases by "1" each time when a search request sent by a user carries a search keyword that is the same as the recommended keyword in question. Doing this for each recommended keyword, the server gets an accumulative count of a respective search frequency for each recommended keyword.

404 is to select from the recommended keywords corresponding to the graphic code those recommended keywords that have a search frequency no lower than a second search frequency threshold.

The second search frequency threshold may be preset. For example, if the second search frequency threshold is set to be "8" (eight times), the graphic code lookup server selects only those corresponding recommended keywords that have a search frequency at or above "8" to be returned to the user. If it is desired that the graphic code lookup server should select all recommended keywords corresponding to the graphic code, the second threshold may be sent to "1" (one time).

For example, the graphic code searched by the user may have the following recommended search keywords: "Sanyuan pure milk", "250 ml Sanyuan pure milk" and "250 ml Beijing Sanyuan pure milk", wherein "Sanyuan pure milk," has been searched six times, "250 ml Sanyuan pure milk" ten times, while "250 ml Beijing Sanyuan pure milk" eight times. If the second threshold of such frequency is set to be "8", the server selects "250 ml Sanyuan pure milk" and "250 ml Beijing Sanyuan milk" as recommended search keywords.

406 is to determine the product information corresponding to the searched graphic code based on the selected recommended keyword(s), and add the product information to the graphic code database.

According this embodiment of the present application, to carry out block S43 (i.e., to determine the corresponding product information based on selected recommended keywords), the server may determine the product information either according to keyword elements obtained by tokenization, or according to the values of the product attributes. These two methods are described below respectively.

Figure 5:
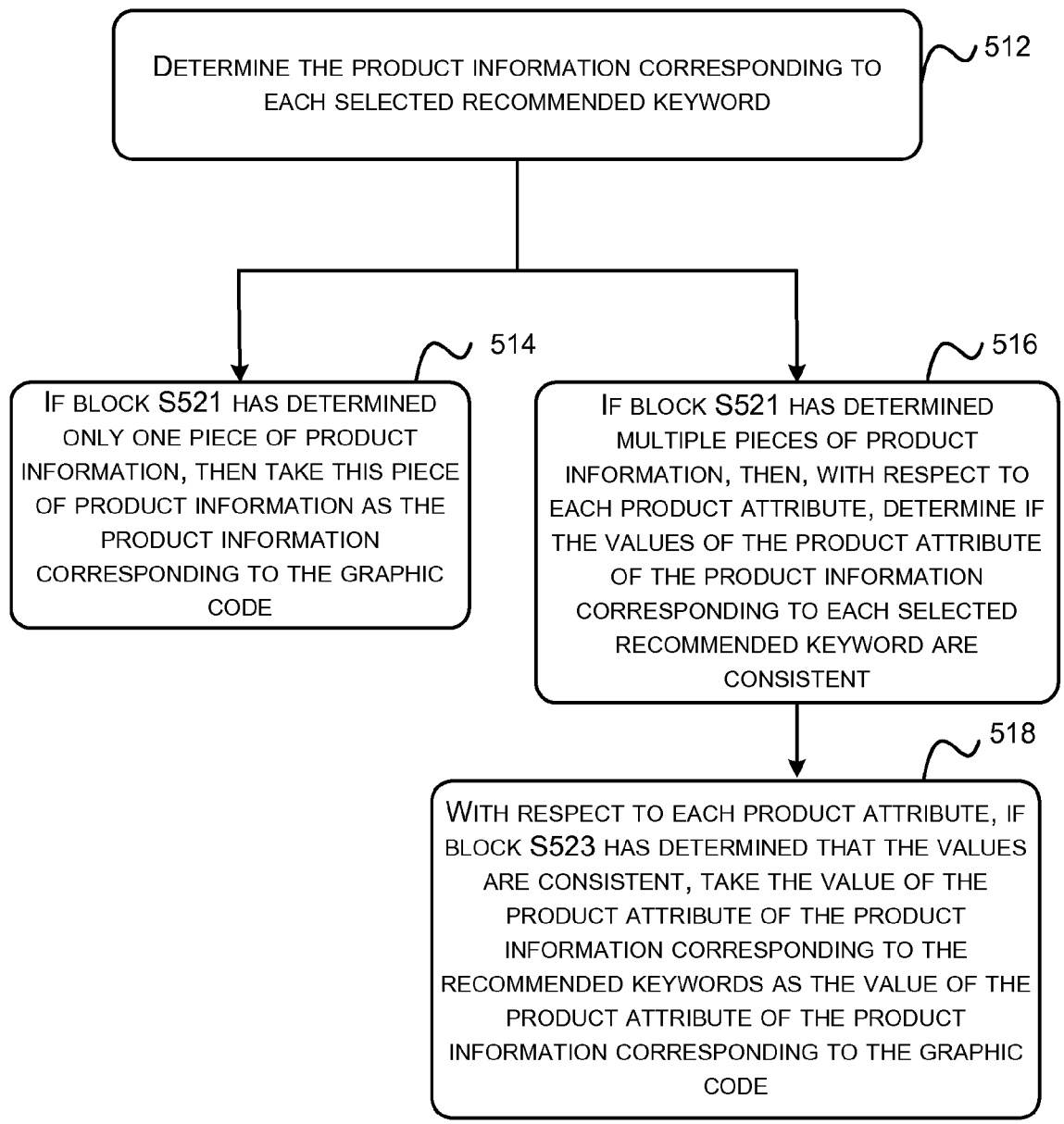

1. Determining the Product Information According to Keyword Elements Obtained by Tokenization As shown in FIG. 5-1, which is a flow diagram of the process for determining product information according to keyword elements obtained by tokenization, the specific process is as follows.

502 is to tokenize the selected recommended keywords to obtain keyword elements. The graphic code lookup server tokenizes each selected recommended keyword by first normalizing the recommended keyword by performing operations such as removing extra words, removing extra spaces, converting uppercase and lowercase letters, converting full-width and half-width, converting simplified and traditional Chinese characters, and removing punctuation, numbers, format conversion, etc. After normalization, the keywords are tokenized (segmented) using a word corpus and word tokenization algorithms based on statistics. The recommended keyword is compared with the various word elements in the word corpus, and each matching word element is recognized as a keyword element (tokenized element) of the recommended keyword.

For example, performing tokenization on recommended keyword "Sanyuan pure milk" gets two keyword elements the "Sanyuan" and "pure milk"; performing tokenization on recommended keyword "250 ml Sanyuan pure milk" gets three keyword elements "250 ml", "Sanyuan" and "pure milk"; while performing tokenization on recommended keyword "250 ml Beijing Sanyuan pure milk" gets four keyword elements "250 ml", "Beijing", "Sanyuan" and "pure milk".

At 504 an occurrence rate of each keyword element is determined.

In determining the occurrence rate of a keyword element, the following exemplary process may be followed with respect to each keyword element obtained by tokenization.

The server first determines the number of occurrences of the keyword element in the selected recommended keywords (i.e., the number of times the keyword element appears in the selected recommended keywords), and then determines the occurrence rate of the keyword element by computing a ratio between the number of occurrences of the keyword element and the number of the recommended keywords.

For example, there are two recommended keywords "250 ml Sanyuan pure milk" and "250 ml Beijing Sanyuan pure milk", and therefore the number of recommended keywords is two. Tokenization obtains four keyword elements "Sanyuan", "pure milk", "250 ml" and "Beijing", wherein the keyword element "Sanyuan" appears two times in the two recommended keywords, keyword element "pure milk" appearance two times, "250 ml" appears two times, and "Beijing" one time. As a result, the keyword element "Sanyuan" has an occurrence rate of 2/2, keyword element "pure milk" has an occurrence rate of 2/2, keyword element "250 ml" has an occurrence rate of 2/2, and keyword element "Beijing" has an occurrence rate of 1/2.

At 506 keyword elements that have an occurrence rate above a threshold are selected from the obtained keyword elements.

The above occurrence rate threshold may have a preset value. For example, the occurrence rate threshold value may be set to "1", and the graphic code lookup server chooses from the obtained keyword elements ones that have an occurrence rate at or above "1". To let the server select all obtained keyword elements, the occurrence rate threshold value may be set to "0".

For example, if the threshold is set to be "1", and since keyword element "Sanyuan" has an occurrence rate of 2/2, "pure milk" has an occurrence rate of 2/2, "250 ml" has an occurrence rate of 2/2, while "Beijing" has an occurrence rate of 1/2, the server would have only "Sanyuan", "pure milk", and "250 ml" as selected keyword elements.

At 508 the product information corresponding to each selected keyword element is determined.

Each product may contain a plurality of product attributes, such as a category, a product name, a brand, specification, place of origin, and price etc. The product information of a product is constituted by such various product attributes. For example, the name attribute value of a certain product may be "250 ml Sanyuan pure milk", the brand attribute value "Sanyuan", the place of origin attribute value "Beijing", the specification attribute value "250 ml", while category attribute value "pure milk".

For some products, the name attribute, brand attribute, place of origin attribute, specification attributes, and category attribute may have fixed values. Such product attributes may be considered basic product attributes shared by all product information of the same product. However, because the product may be sold by different merchants at different prices, the price attribute of the product may have multiple values and is therefore considered a variable product attribute. For example, the first merchant may sell a certain product at a price of 2.5 Yuan, the second merchant may sell the same product at a price of 2.8 Yuan, the third merchant may sell it at 3 Yuan, while the fourth merchant at 3.2 Yuan. As a result, the price attribute of this product has multiple values such as "Merchant 1: 2.5 Yuan", "Merchant 2: 2.8 Yuan", "Merchant 3: 3 Yuan" and "Merchant 4: 3.2 Yuan".

The exemplary product information stored in the product information database may be summarized in the following table:

| | Category | Product name | Brand | Origin | Specification | Price |
|---|---|---|---|---|---|---|
| Product information 1 | pure milk | 250 ml Sanyuan pure milk | Sanyuan | Beijing | 250 ml | merchant 1: 2.5 Yuan merchant 2: 2.8 Yuan merchant 3: 3 Yuan |
| Product information 2 | pure milk | 150 ml Sanyuan pure milk | Sanyuan | Beijing | 150 ml | merchant 1: 1.5 Yuan merchant 2: 1.8 Yuan merchant 3: 1.5 Yuan merchant 4: 1.6 Yuan |
| Product information 3 | pure milk | 250 ml Guangming pure milk | Guangming | Shanghai | 250 ml | merchant 1: 2.6 Yuan merchant 2: 3 Yuan merchant 3: 3.2 Yuan |
| Product information 4 | pure milk | 150 ml Guangming pure milk | Guangming | Shanghai | 150 ml | merchant 1: 1.5 Yuan merchant 2: 1.7 Yuan |

To determine the product information corresponding to each selected keyword element, the server may use the following process with respect to the product information of each product stored in the product information database: match each selected keyword element with the product information; and if every selected keyword element successfully matches the product information, treat this product information as the product information corresponding to the selected keyword elements.

To match a keyword element with certain product information, the keyword element is compared with the values of product attributes of the product information. The server may first emerge the attribute values of each basic product attribute in the product information, and then match each keyword element, respectively, with the merged attribute values. If the merged attribute values contain a certain keyword element, the keyword element and the merged attribute values are considered to have a successful match, and accordingly the keyword element and this product information are considered to have a successful match.

For example, suppose the selected keyword elements are "Sanyuan", "pure milk" and "250 ml". With respect to "product information 1" in the above table, graphic code lookup server first merges the attribute values of each basic product attribute in this product information. The resultant merged attribute value is "250 ml Sanyuan pure milk Beijing". Matching each selected keyword element "Sanyuan", "milk" and "250 ml" with the above merged attribute value respectively shows that each selected keyword element is found in the merged attribute value, indicating a successful match between both selected keyword elements and "product information 1", and therefore "product information 1" is taken as the product the information corresponding to the selected keyword elements. With respect to "product information 2", merging the attribute values of each basic product attribute in this product information results in a merged attribute value "150 ml Sanyuan pure milk Beijing". Matching each selected keyword element "Sanyuan", "milk" and "250 ml" with the above merged attribute value respectively shows that the selected keyword element "250 ml" is not found in the merged attribute value, indicating an unsuccessful match between the selected keyword element "250 ml" and "product information 2", and therefore "product information 2" is not taken as the product the information corresponding to the selected keyword elements. The server performs the above process with respect to each piece of product information stored in the product information database in order to determine the product information corresponding to the selected keyword elements. Multiple pieces of product information may be found to correspond to the selected keyword elements in question.

At 510 product information of the graphic code based on the above determined product information corresponding to the selected keyword elements is determined.

If 508 has determined that only one piece of product information corresponds to the selected keyword elements, the graphic code lookup server may simply recognize this piece of product information as the product information of the graphic code.

If 508 has determined that at least two pieces of product information correspond to the selected keyword elements, the server may return to the user a product information request carrying the multiple pieces of product information, and guide the user to select, from the multiple pieces of product information displayed to the user on a terminal device, the relevant product information corresponding to graphic code. After the user has made a selection, the terminal device sends the selected product information to the server, which then takes the user selected product information as the product information of the graphic code in question.

Figure 6:
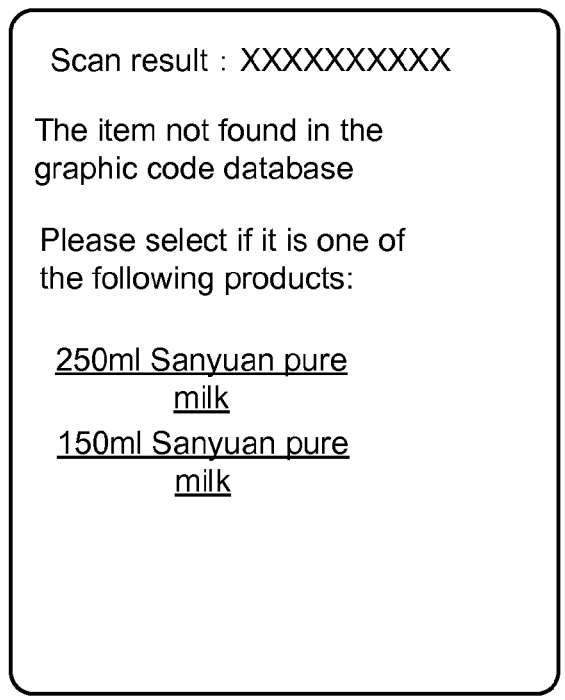
FIG. 6 is an interface schematic of a terminal device in accordance with the second embodiment of the application, wherein the graphic code lookup server returns a request for selecting product information.

For example, as shown in FIG. 6, the graphic code lookup server sends to the user a product information selection request carrying the values of the product name attribute of all product information corresponding to the selected keyword elements. The user receives the values of the product name attribute at the terminal device, and is guided to select a value of the name attribute among the displayed values for the product information corresponding to the graphic code. The terminal device sends the user selected value of the name attribute to the server, which then takes the product information that has the selected value of the name attribute to be the product information of the graphic code.

Furthermore, the second embodiment of the present application also proposes that, upon selecting the keyword elements, the server may combine the selected keyword elements to obtain a compounded recommended keyword, and take the compounded recommended keyword as the recommended keyword of the graphic code, and add the recommended keyword to the graphic code database.

Compounding the selected keyword elements may be done by first determining a compounding order of the keyword elements based on the position relationship of the keyword elements in the recommended keywords, and then combining the selected keyword elements according to the compounding order.

Specifically, suppose the position relationship of the keyword elements in recommended keyword A is a/b/c, the position relationship of the keyword elements in recommended keyword B is d/a/b/c, and that in recommended keyword C is a/e/b. Among the obtained keyword elements, the server selects keyword elements a, b and e. From the position relationship of the selected keyword elements in the recommended keywords, it is derived that keyword element "a" is positioned before "b", and keyword element "e" is positioned before "b", and keyword element "a" is positioned before "e", and as a result, the compounding order of the selected keyword elements a→e→b, and the compounded recommended keyword should be a/e/b.

For example, suppose the server selects keyword elements "Dukang" and "Zhen wine". According to the position relationship of these two keyword elements in the recommended keywords, it is concluded that the compounding order of these two selected keyword elements is "Dukang"→"Zhen wine", so the compounded recommended keyword should be "Du Kang Zhen wine".

The server then takes the compounded recommended keyword as the recommended keyword of the graphic code, and adds it to the graphic code database. When subsequent users look for product information corresponding to the same graphic code, the server may return the compounded recommended keyword to the users. This improves the accuracy of the recommended keywords sent to the users and improves the efficiency of finding product information by users.

2. Determining Product Information Based on the Values of Product Attributes

FIG. 5-2 is a flow diagram of a method for determining product information based on the values of product attributes. The specific process is as follows:

At 512 the product information corresponding to each recommended keyword is determined. In the process, the graphic code lookup server performs the following steps with respect to each recommended keyword.

First, the recommended keyword is tokenized to obtain keyword elements. The process of tokenization may be the same as that described with 502 and is not repeated here. The server compares each keyword element with each piece of product information stored in the product information database to find a match. If every keyword element has a successful match, the particular piece of product information is taken as the product information corresponding to the recommended keyword.

To match each keyword element with a piece of product information, the server may first emerge the values of the basic product attributes in the piece of product information to obtain a merged attribute value, and then match each keyword element with the merged attribute value. If the merged attribute value contains a keyword element, the keyword element is considered to have a successful match with the merged attribute value, and the keyword element is thus considered to have a successful match with the product information.

At 514, if 512 has resulted in just one piece of matching product information, this piece of product information is taken as the product information of the graphic code.

Wherein, each recommended keyword may correspond to one or more pieces of product information. For example, recommended keyword "Sanyuan pure milk" corresponds to "product information 1" and "product information 2" in the above table. In addition, multiple recommended keywords may correspond to the same piece of product information. For example, recommended keyword "250 ml Sanyuan pure milk" and "250 ml Beijing Sanyuan pure milk" both correspond to "product information 1" in the above table.

As proposed in the second embodiment of the present application, if the selected recommended keywords all correspond to the same product information, the product information may be taken straight as the product information of the graphic code in question.

At 516, if 512 has resulted in multiple pieces of product information, the server analyzes whether the values of each product attribute in the product information corresponding to each recommended keyword are consistent. Usually, the values of the same product attribute may need to be identical or essentially equivalent in order to be consistent.

At 518, for each product attribute, if block 516 has concluded that the attribute value is consistent, the value of the product attribute in the product information corresponding to the recommended keywords is taken as the value of product attribute of the product information corresponding to the graphic code.

For example, supposed the server has determined that the product information includes "product information 1" and "product information 2" of the above table. With regard to the category attribute first, the server examines whether the value of the category attribute of "product information 1" and that of "product information 2" are consistent. As both are "pure milk" in this case indicating consistency, it is determined that the value of category attribute of the product the information corresponding to the graphic code should be "pure milk". With regard to product name attribute, the server examines whether the value of the product name attribute of "product information 1" and that of "product information 2" are consistent. As the two values are different indicating inconsistency in this case, the value of the product name attribute of the product information corresponding to the graphic code is left blank. With regard to the brand attribute, the server examines whether the value of the brand attribute of "product information 1" and that of "product information 2" are consistent. As both are "Sanyuan" in this case indicating consistency, it is determined that the value of the brand attribute of the product information corresponding to the graphic code is "Sanyuan". With regard to the place of origin attribute, the server examines whether the value of the place of origin attribute of "product information 1" and that of "product information 2" are consistent. As both are "Beijing" in this case indicating consistency, it is determined that the value of the place of origin attribute of the product information corresponding to the graphic code is "Beijing". With regard to the specification attribute, the server examines whether the value of the specification attribute of "product information 1" and that of "product information 2" are consistent. As the two values are different indicating inconsistency, the value of the specification attribute of the product information corresponding to the graphic code is left blank. With regard to the price attribute, the server examines whether the value of the price attribute of "product information 1" and that of "product information 2" are consistent. As answer is no in this case, the value of the price attribute of the product information corresponding to the graphic code is left blank.

In the above method of determining product information based on the product attribute values, although some of the product attribute values of the determined product information may be left blank, such attribute values may be updated by subsequent users to attain integrity of the product information.

In this embodiment, in order to ensure the accuracy of the determined product information, the server may determine the product information based on recommended keywords only if the number of recommended keywords reaches a preset threshold.

The following describes a method for determining product information based on how frequently the product information, when returned to users, is clicked by the users.

Figure 7:
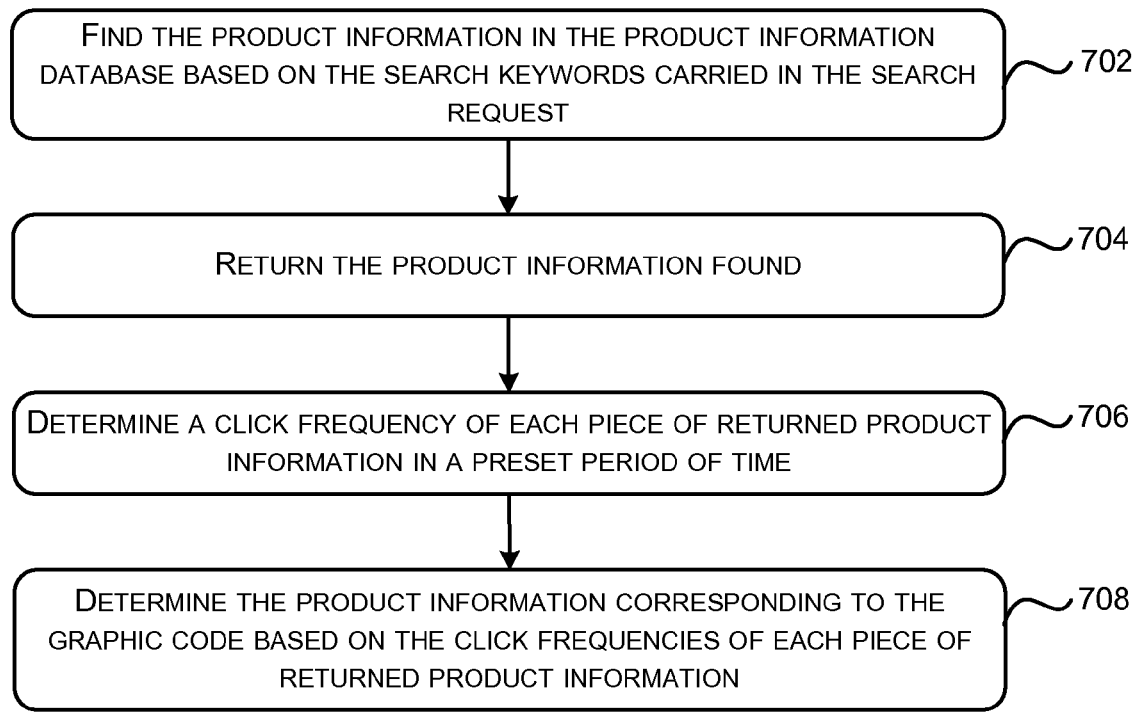
FIG. 7 is a flow diagram of a process of determining product information based on user clicks of product information resulted from search, in accordance with a third embodiment of the present application.

FIG. 7 is a flow diagram of a method for determining product information based on user clicks of the product information returned as a search result. The specific process is as follows:

At 702 product information in the database is searched based on the search keyword carried in the search request.

Upon receiving a search request carrying a search keyword sent from the user, the graphic code lookup server searches the corresponding product information in the database according to the search keyword. The search request may also be forwarded to a search server, which performs the search and returns the search result to the graphic code lookup server. Searching product information using a search keyword may be done using a suitable existing search technology, which is not repeated herein.

At 704 the product information is returned as a search result.

The graphic code lookup server returns at least some product information in the search result to the user, who receives the product information with a terminal device to be displayed thereon.

At 706 the number of clicks each returned product information has received in a certain time period is determined.

As a user browses the product information returned from the graphic code lookup server, the user may find a certain piece of product information to be the product information corresponding to the graphic code, and clicks on the piece of product information to further view. As proposed in the second embodiment of the present application, the graphic code lookup server records such user activities in a user activity log as graphic code search activity, product information search activity, click activity with regard to the returned product information, and purchase activity with regard to the clicked product information. The recorded information of each click activity may include the product information that is clicked on and the time when the click takes place.

In order to determine the product information corresponding to a certain graphic code, the graphic code lookup server may use information stored in the activity log such as the time stamps corresponding to the click activity to determine the click activity data of each product information within a time range, and calculate the number of times each product information has been clicked during the time range. The time range may be preset. For example, it may be set to one month.

At 708 the product information corresponding to the graphic code is determined based on the number of clicks of each product information.

The product information of the graphic code may be determined using an approach including but not limited to the following two examples.

According to the first approach, the product information that has the highest number of is recognized as the product information corresponding to the graphic code.

If a product information has the highest number of clicks, it may indicate that the largest number of users regarded the product information as the relevant product information of the graphic code, given basis to take this product information as the product information corresponding to the graphic code.

According to the second approach, the server finds product information, in the returned product information, that has a click frequency higher than a preset click frequency threshold, and, with respect to each product attribute of the found product information, performs the following operations:

First, check if the values of the product attribute of all found product information are consistent. If result is yes, take the value of the product attribute of the found product information to be the value of this product attribute of the product information corresponding to the graphic code.

For example, suppose the server found "product information 3" and "product information 4" in the above table to have a click frequency above a threshold. The server first checks if the values of the category attribute of "product information 3" and "product information 4" are consistent. As both values are "pure milk", the answer in this case is yes, and the server decides that the value of the category attribute of the product information corresponding to the graphic code in question is "pure milk". The values of the product name attribute of "product information 3" and "product information 4" are then checked and found to be inconsistent. The value of the product name attribute of the product information corresponding to the graphic code is thus left blank. The values of the brand attribute of "product information 3" and "product information 4" are checked and found to be consistent, both being "Guangming", so the server decides that the value of the brand attribute of the product information corresponding to the graphic code is "Guangming". The values of the place of origin attribute of "product information 3" and "product information 4" are checked and found to be consistent, both being "Shanghai", so the server decides that the value of the place of origin attribute of the product information corresponding to the graphic code is "Shanghai". The values of the specification attribute of "product information 3" and "product information 4" are checked and found to be inconsistent, thus the value of that attribute of the product information corresponding to the graphic code is left blank.

In the above second approach, although some of the product attributes of the product information may be left blank initially, they can be updated by the subsequent users as guided to maintain the integrity of the product information.

As the graphic code lookup server determines the product information corresponding to the graphic code used and described above, and adds the product information to the graphic code database, the product information in the graphic code database is automatically updated. This enables the server to provide the updated product information to subsequent users searching for product information corresponding to the same graphic code, making the subsequent product comparison and purchase more convenient. The methods for determining the product information requires no manual human operation in the backend, thus saving labor, making the process unaffected by work schedules and improving the efficiency of product information updates.

In the methods in the embodiments of the present application described above for determining product information corresponding to a graphic code, the value of some product attributes of the product information may be blank. In order to be able to provide users with a more complete product information, the following embodiment of the present application is disclosed, in which the graphic code lookup server can guide users to update the corresponding attribute value. This embodiment proposes two different approaches for updating attribute values of product information as described separately below.

1. The First Approach for Updating Attribute Values of Product Information

Figure 8:
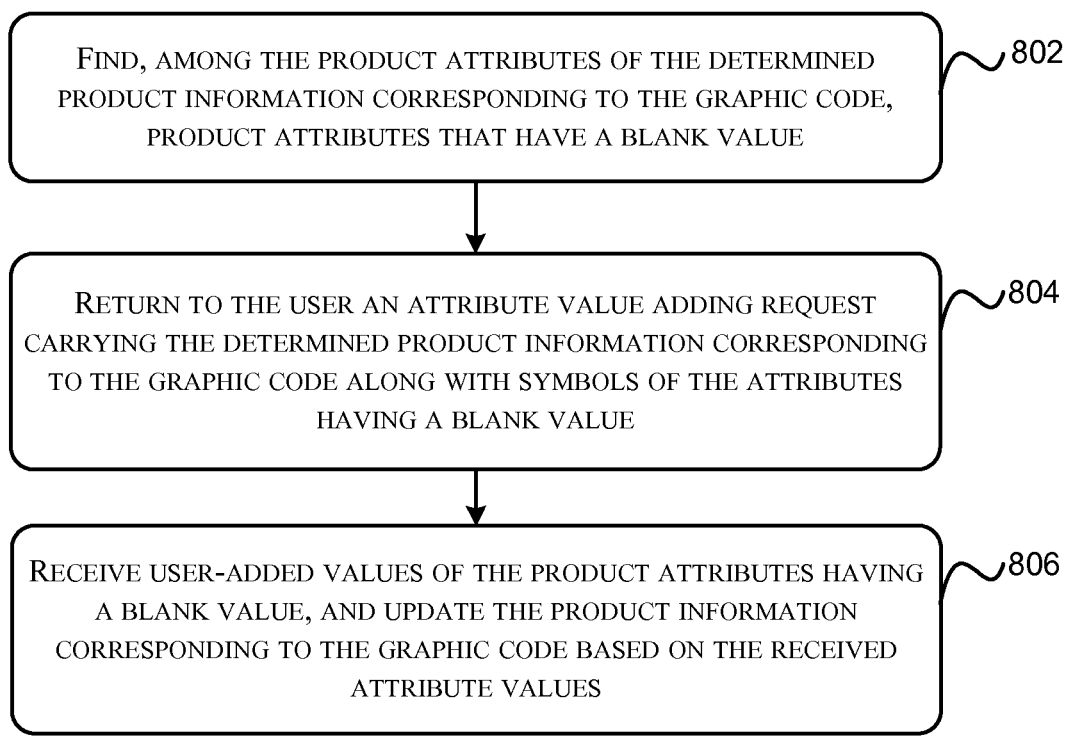
FIG. 8 is a flow diagram of a first approach for updating an attribute value of product information, in accordance with a fourth embodiment of the present application.

FIG. 8 is a flow diagram of a process used for updating attribute values of product information in accordance with the fourth embodiment of the present application. The specific process is as follows:

At 802, among the product attributes of the product information corresponding to the graphic code, those product attributes having a blank value are found.

Upon determining the product information corresponding to the graphic code, the graphic code lookup server identifies product attributes that have a blank value. With respect to each product attribute, the server determines whether the product attribute does not have a value (i.e., whether the attribute value is blank). If it is determined that every product attribute of the current product information has a value, the server skips over the operations of updating attribute values.

At 804 a request for adding an attribute value is returned to the user. The request carries the determined product information corresponding to the graphic code along with symbols of the product attributes that do not have a value.

The graphic code lookup server can return the request for adding an attribute value to the users who have previously searched for the graphic code in question, that is, to the users who have previously sent a search request carrying the graphic code in question. The server may send the request for adding attribute value to all such uses, and subsequently update the product information corresponding to the graphic code based on the attribute values added by the users. Alternatively, the server may select just some of the users who have previously searched for the graphic code, return the request for adding attribute value to these selected uses, and update the product information corresponding to the graphic code based on the attribute value added by these uses.

During the process, the graphic code lookup server may record such user activities in a user activity log as graphic code inquiry activity, product information search activity, click activity with regard to the returned product information, and purchase activity with regard to the clicked product information. It may be determined from the user activity log whether the user has had certain inquiry activities, search activities, clicking activities, and purchasing activities. Each user's activity log is used to select, first, those users who have sent a search request (i.e., users who have had search activities) among the users who inquired about the graphic code (i.e., users who have had inquiry activities); second, select those users who have clicked the product information returned by the server (i.e., users who have had clicking activities) among the users who have sent a search request; and finally select those users who have purchased the product among the users from the users who have clicked the product information.

If the graphic code lookup server in 802 finds that the specification attribute has a blank value, the server may return to the user the symbol of the specification attribute carried by a request for adding attribute value. The request may also carry the determined product information corresponding to the graphic code. Upon receiving the attribute symbol and the product information at the terminal device, the user is guided to add a value corresponding to the specification attribute of the product information. The user may tell from the product information which previously inquired product corresponds to the received product information, and thus obtain we choose the product specification in order to be entered at the terminal device.

At 806 the attribute value sent back from the user is received, and the product information corresponding to the graphic code based on the received attribute value is updated, which corresponds to a product attribute whose value is presently blank.

The user can use the terminal device to send the added attribute values back to the graphic code query server. For example, the user may send the added attribute value along with the symbol of the attribute back to the server, so that the server may determine which product attribute corresponds to the added attribute value based on the received attribute symbol, and update that product attribute using the user added attribute value accordingly. Alternatively, if the server has found only one attribute that has a blank value, and accordingly only one attribute value is received from the user, the user may need not to send back the attribute symbol. In this case, the server directly updates the value of that attribute using the user added attribute value.

2. The Second Approach for Updating Attribute Values of Product Information

Figure 9:
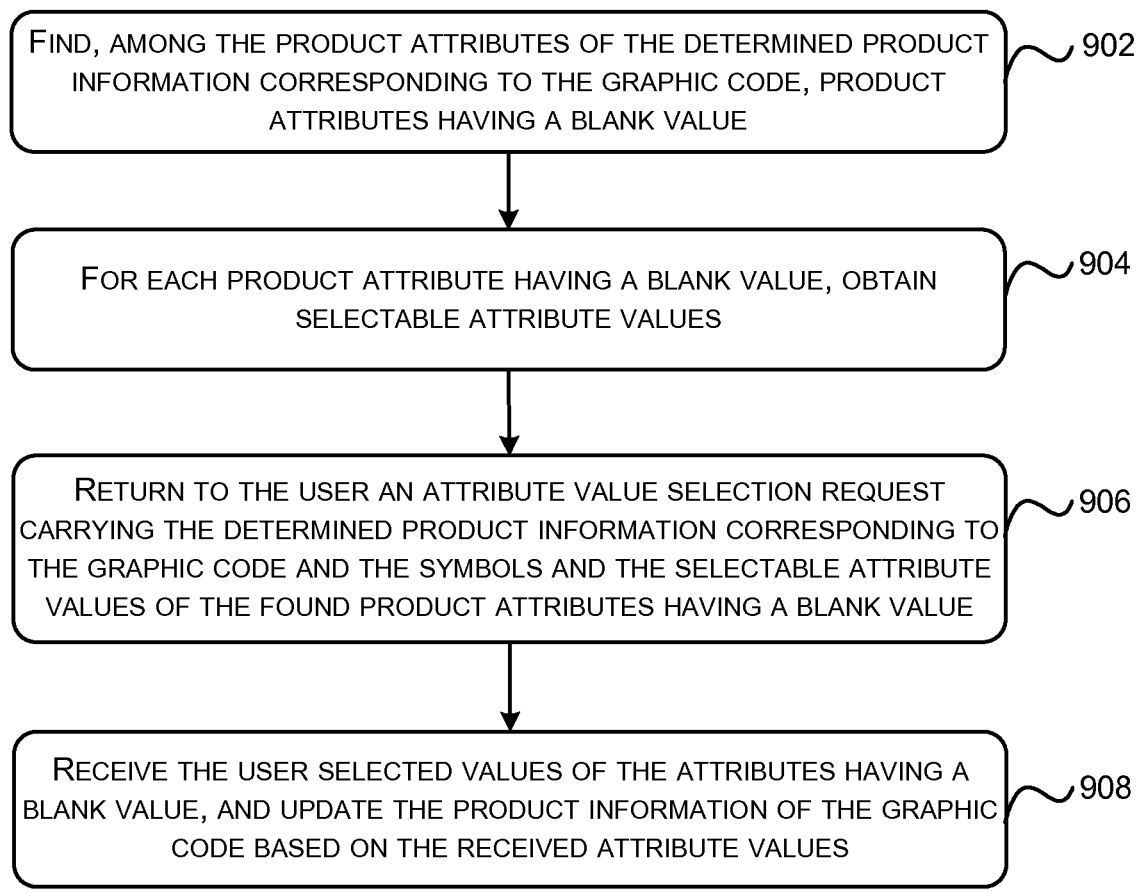
FIG. 9 is a flow diagram of a second approach for updating an attribute value of product information, in accordance with the fourth embodiment of the present application.

FIG. 9 is a flow diagram of a second approach for updating attribute values of product information in accordance with the fourth embodiment of the present application.

At 902, among the product attributes of the product information corresponding to the graphic code, the product attributes which have a blank value are found.

Upon determining the product information corresponding to the graphic code, the graphic code lookup server determines, with respect to each product attribute of the product information, whether the attribute has a blank value. If every attribute of the property information has a non-blank value, the server skips the process of updating attribute values.

At 904 selectable attribute values for each attribute that has a blank value are looked up.

The selectable attribute values may be added manually by personnel, or added automatically by the graphic code lookup server. Specifically, with respect to each product attribute that has a blank value, the server may look up all available values of this attribute that are stored in the product information database, and take the identified values as the selectable values for the attribute.

At 906 an attribute selection request to the user is returned, wherein the attribute selection request carries the determined product information corresponding to the graphic code, along with the symbols of the attributes which are found to have a blank value, and selectable attribute values corresponding to these attributes.

The server may return the attribute selection request to users who have previously inquired about the current graphic code (i.e., users who have previously sent an inquiry request carrying the graphic code in question). To do this, the server may send the attribute selection request to all users who have inquired about the graphic code, and update the product information corresponding to the graphic code based on the attribute values selected by the users. Alternatively, the server may select just some of the users who have previously inquired about the graphic code, send the attribute value selection request to the selected users, and update the product information based on the attribute values selected by the users. The users may be selected using the same process as described in 804 and the process is not repeated here.

If the graphic code lookup server in block 902 finds that the specification attribute has a blank value, the server may return an attribute value selection request carrying the symbol of the specification attribute along with the corresponding selectable attribute values to the user. The request may further carry the determined product information corresponding to the graphic code. The user's terminal device displays the received product information, the attribute symbol and the selectable values to guide the user to make a choice among the selectable values. The user may determine which previously inquired product corresponds to the received product information and select the proper specification values of the product on the terminal device accordingly.

At 908 the attribute values selected by the user are received, and the product information corresponding to the graphic code based on the attribute values received is updated.

The user can use the terminal device to send the selected attribute values and the corresponding attribute symbol back to the graphic code query server. The server may determine which product attribute corresponds to the user selected attribute values based on the received attribute symbols, and update the determined product attribute using the user added attribute value accordingly. Alternatively, if the server has found only one attribute that has a blank value, and accordingly only one attribute value is received from the user, the user may need not to feedback the attribute symbol. In this case, the server directly updates the value of that attribute using the user selected attribute value.

Figure 10:
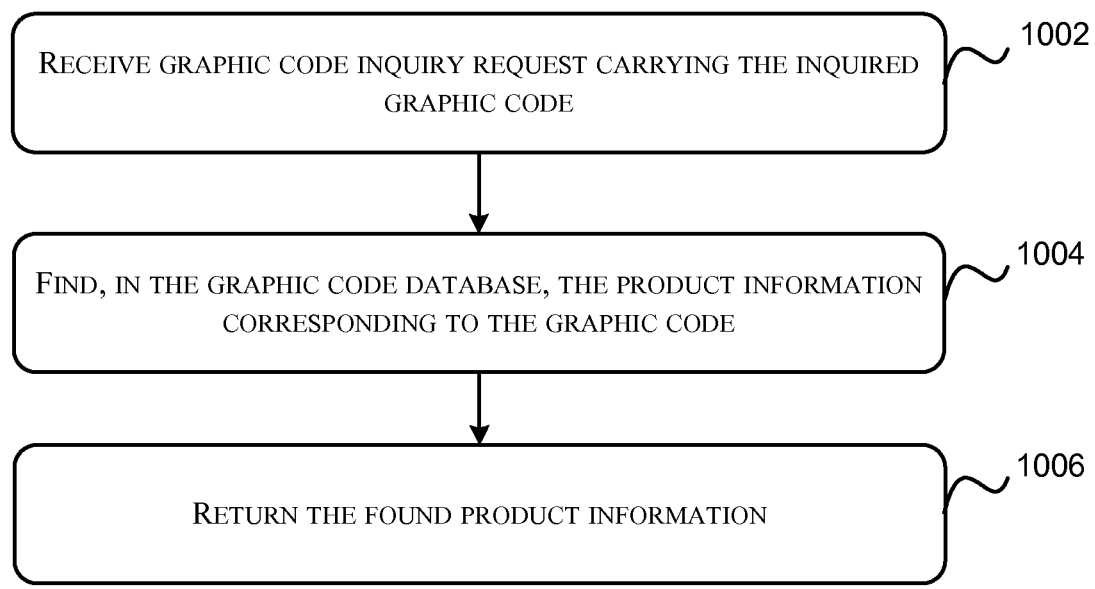
FIG. 10 is flow diagram of a method for searching a graphic code database, in accordance with a fifth embodiment of the present application.

In the methods for determining product information in accordance with the embodiments described above, and the method for updating attribute values of product information as also described above, the graphic code lookup server is able to update the product information in the graphic code database, such that the updated product information may be sent to users in response to subsequent user inquiries. Accordingly, the following embodiment proposes a method for inquiring a graphic code database updated in this matter. FIG. 10 is a flow diagram of the specific process as described as follows:

At 1002 a graphic code inquiry request carrying a graphic code to be searched is received.

At 1004 the product information is searched for corresponding to the graphic code in the graphic code database.

At 1006 the found product information is returned to the user.

Because the graphic code lookup server can automatically update the graphic code database, the product information in the graphic code database and the product information of new products maintain a high degree of consistency, and user inquiries have a higher hit rate and improved product information query efficiency.

Figure 11:
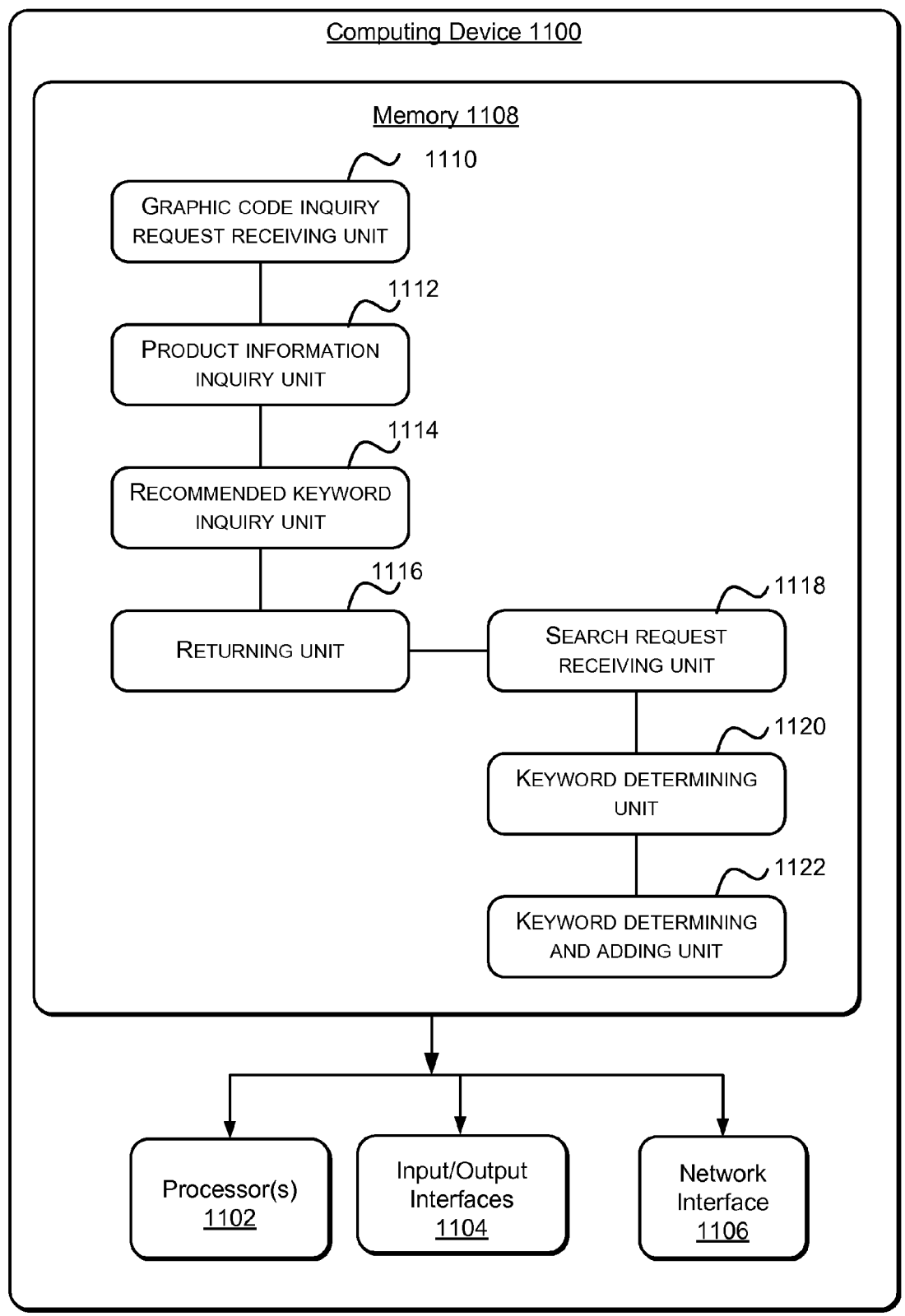
FIG. 11 is a system schematic of an apparatus for updating a graphic code database, in accordance with a sixth embodiment of the present application.

The following embodiment is an exemplary apparatus used for updating graphic code database in accordance with embodiments described above. FIG. 11 is a diagram of a computing device 1100. The computing device 1100 may be a user device or a server for updating a graphic code database. In one exemplary configuration, the computing device 1100 includes one or more processors 1102, input/output interfaces 1104, network interface 1106, and memory 1108.

The memory 1108 may include computer-readable media in the form of volatile memory, such as random-access memory (RAM) and/or non-volatile memory, such as read only memory (ROM) or flash RAM. The memory 408 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

Turning to the memory 1108 in more detail, the memory 1108 may include the following units:
- a graphic code query request receiving unit 1110, configured for receiving a graphic code query request carrying a graphic code to be searched;
- a product information inquiry unit 1112, configured for finding whether product information corresponding to the graphic code is contained in a graphic code database;
- a recommended keyword query unit 1114, configured for finding, when the product information corresponding to the graphic code is not found in the graphic code database, whether a recommended keyword corresponding to the graphic code is contained in the graphic code database;
- a returning unit 1116, configured for returning the recommended keyword corresponding to the graphic code and a search box for receiving a search keyword, or for returning only the search box for receiving the search keyword when the recommended keyword query unit finds no recommended keyword;
- a search request receiving unit 1118, configured for receiving a search request carrying a search keyword, the search keyword being selected from the returned recommended keywords, or a custom search keyword entered through the search box;
- a keyword determining unit 1120, configured for determining whether the search keyword matches the recommended keyword corresponding to the graphic code; and
- a keyword determining and adding unit 1122, configured for, when the search keyword is determined to not match the recommended keyword corresponding to the graphic code, taking the search keyword to be a new recommended keyword corresponding to the graphic code, and adding the new recommended keyword to the graphic code database.

The returning unit 1116 may be configured for, when the inquiry result of the recommended keyword inquiry unit 1114 is affirmative, determining a search frequency of each recommended keyword, and returning those recommended keywords whose search frequency exceeds a preset first search frequency threshold.

The apparatus for updating the graphic code database may further include the following units:
- a search frequency determining unit, configured for determining the search frequency of each recommended keyword;
- a recommended keyword selection unit, configured for selecting, from the recommended keywords corresponding to the graphic code, those recommended keywords whose search frequency is not lower than a second search frequency threshold; and
- a product information determining and adding unit, configured for determining the product information of the graphic code and adding the product information to the graphic code database, based on the recommended keywords selected by the recommended keyword selection unit.

The product information determining and adding unit may include:
- a keyword tokenization unit, configured for tokenizing each recommended keyword selected by the recommended keyword selection unit to obtain keyword elements;
- an occurrence rate determining subunit, configured for determining a rate of occurrence of each keyword element obtained by the keyword tokenizing unit;
- a keyword element selection subunit, configured for selecting, from the keyword elements obtained by the keyword tokenization unit, those keyword elements whose rate of occurrence is not lower than a preset threshold rate;
- a first product information determining subunit, configured for determining the product information corresponding to each keyword element selected by the keyword element selection subunit;
- a second product information determining subunit, configured for determining the product information corresponding to the graphic code based on the product information that is determined by the first product information determining subunit and corresponds to the keyword elements selected by the keyword element selection subunit.

The apparatus for updating graphic codes database may further include the following units:
- a keyword compounding unit, configured for combining the keyword elements selected by the keyword element selection unit to form compounded keywords. The keyword determining and adding unit may take a compounded word and make it a recommended keyword corresponding to the graphic code, and further add the new recommended keyword to the graphic code database.

The occurrence rate determining subunit may be configured for determining an occurrence rate of each keyword element obtained by the keyword tokenization unit. The occurrence rate of each keyword element is determined by first determining a number of occurrences of the keyword element appearing in the recommended keywords selected by the keyword selection unit, and then calculating a ratio between the number of occurrences and the number of recommended keywords selected.

The first product information determining subunit may be configured for matching each keyword element selected by the keyword element selection subunit with each product information stored in the product information database, and, if the matching is successful for every keyword element, taking the product information as the product information corresponding to the selected keyword elements.

The second product information determining subunit may be configured for, when the keyword elements selected by the keyword element selection subunit correspond to only one piece of product information, taking the product information as the product information corresponding to the graphic code; and when the keyword elements selected by the keyword element selection subunit correspond to multiple pieces of product information, returning to the user a product information selection request carrying the multiple pieces of product information, receiving the product information selected by the user among the multiple pieces of product information, and taking the user selected product information as the product information corresponding to the graphic code.

The product information determining and adding unit may include:
- a third product information determining subunit, configured for determining the product information corresponding to the recommended keywords selected by recommended keyword selection unit;
- a fourth production information determining subunit, configured for, if the third production information determining subunit has determined only one piece of product information, taking the only one piece of product information as the product information corresponding to the graphic code; and if the third production information determining subunit has determined multiple pieces of product information, determining, for each product attribute of the product information, whether the values of the product attribute of the product information corresponding to the recommended keywords selected by the recommended keyword selection unit are consistent, and if determined to be consistent, taking the value of the attribute of the product information corresponding to the recommended keywords to be the value of the attribute of the product information corresponding to the graphic code.

The third product information determining subunit may be configured for, with respect to each recommended keyword selected by the recommended keyword selection unit, tokenizing the recommended keyword to obtain keyword elements, and matching each keyword element with each piece of product information stored in the product information database; and if the matching is successful for every keyword element to one piece of product information, taking the one piece of product information to be the product information corresponding to the graphic code.

The apparatus for updating the graphic code database may further include the following units:
- a product information search unit, configured for searching product information in the product information database according to a keyword carried by a search request;
- a product information returning unit, configured for returning the product information found by the product information search unit;
- a click rate determining unit, configured for determining the number of clicks received in a preset time period by each piece of product information returned by the product information returning unit;
- a product information determining unit, configured for determining the product information corresponding to the graphic code based on the click rates of the product information.

The product information determining unit may take the product information with the highest click rate to be the product information corresponding to the graphic code.

The product information determining unit may find, from the product information returned by the product information returning unit, each piece of product information that has a click rate exceeds a preset threshold click rate, and, with respect to each product attribute of the product information, determining if the values of the product attribute of all found pieces of product information are consistent. If the values of the product attribute are found to be consistent, the product information determining unit recognizes the value of this product attribute of the found pieces of product information to be the value of the attribute of the product information corresponding to the graphic code.

The apparatus for updating the graphic code database may further include the following units:
- a first product attribute lookup unit, configured for finding, among the product attributes of the determined product information corresponding to the graphic code, product attributes that have a blank value;
- an attribute value adding request unit, configured for returning an attribute adding request to the user, wherein the request carries the determined product information corresponding to the graphic code along with the symbols of the product attributes that have a blank value as determined by the first product attribute lookup unit; and
- an attribute value receiving unit, configured for receiving from the user added attribute values of the product attributes that currently have a blank value.

The apparatus for updating graphic code database may further include the following units:
- a second product attribute lookup unit, for finding, among the product attributes of the determined product information corresponding to the graphic code, product attributes that have a blank value;
- a selectable attribute value obtaining unit, for obtaining selectable values for the product attributes that have a blank value as determined by the second product attribute lookup unit;
- an attribute value selection request returning unit, for returning to the user an attribute value selection request carrying the determined product information corresponding to the graphic code, along with the symbols and the corresponding selectable values of the product attributes that have a blank value as determined by the second product attribute lookup unit;
- a selectable attribute value receiving unit, for receiving from the user attribute values selected by the user for the product attributes; and
- a second project information updating unit, for updating the product information corresponding to the graphic code based on the selectable attribute values received by the selectable attribute value receiving unit.

The graphic code database updating apparatus in as described may be embodied using computer programs. Skilled in the art should be able to appreciate that the above described unit-division is only one of many possible ways. If the apparatus is divided into other functional units, or not divided at all, it would still be within the scope of the present application, as long as the apparatus accomplishes the functions described herein.

The graphic code database updating apparatus may be provided in the graphic code lookup server. That is, the graphic code lookup server may provide the above described functions of in apparatus for updating the graphic code database. Alternatively, the apparatus for updating the graphic code database may also be provided in another server.

Figure 12:
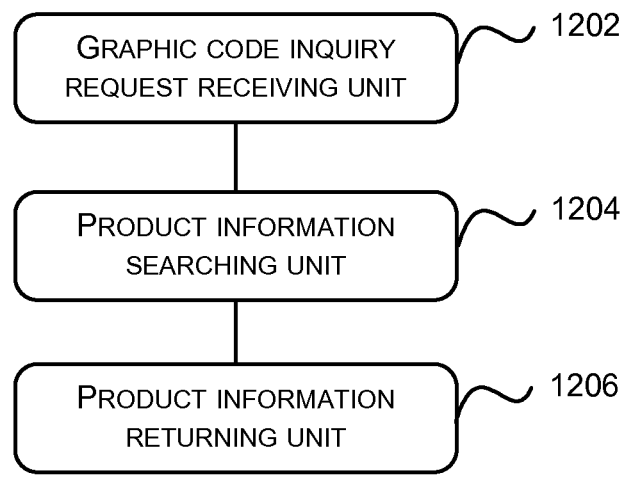
FIG. 12 is a system schematic of an apparatus for searching a graphic code database, in accordance with the sixth embodiment of the present application.

Based on the graphic code database query method described above, a graphic code database query apparatus is proposed in accordance with the sixth embodiment of the present application. As shown in FIG. 12, the apparatus include the following units:
- a graphic code query request receiving unit 1202, configured for receiving a graphic code query request carrying a graphic code to be searched;
- a product information search unit 1204, configured for finding the product information corresponding to the graphic code in the graphic code database which is updated by the updating apparatus in accordance with the sixth embodiment of the present application; and a product information returning unit 1206, configured for returning the product information found by the product information search unit 1202.

The graphic code database query apparatus as described above may be embodied using computer programs. Skilled in the art should be able to appreciate that the above described unit-division is only one of many possible ways. If the apparatus is divided into other functional units, or not divided at all, it would still be within the scope of the present application, as long as the apparatus accomplishes the functions described herein.

The graphic code database inquiry apparatus may be provided in the graphic code lookup server. That is, the graphic code lookup server may provide the above described functions of in apparatus for inquiring the graphic code database. Alternatively, the apparatus for inquiring the graphic code database may also be provided in another server.

Persons skilled in the art should appreciate that the embodiments of the present application may provide for a method, a system, or a computer program product. Accordingly, an embodiment of the present application may be entirely hardware-based, entirely software-based, or based on a combination of software and hardware. Moreover, the present application may be embodied in the form of an executable computer program product stored in one or more computer-usable storage media (including, but not limited to, a disk storage, CD-ROM, an optical memory, etc.).

This application is described using references to flowcharts or block diagrams of computer program products in accordance with the various embodiments. It is understood that the flowcharts and/or block diagrams for each process, and/or blocks, and a combination of the flowcharts and block diagram of the process, maybe carried out using computer program instructions. These computer program instructions may be provided to a general purpose computer, special purpose computer, embedded processor or other programmable data processing apparatus to create a machine, such that the instructions are executed by a computer or other programmable data processing apparatuses to accomplish the functions specified in one or more processes of a flow diagram, and/or a block diagram.

It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

Although the subject matter has been described in language specific to structural features and/or methodological acts, it is to be understood that the subject matter defined in the appended claims is not limited to the specific features or acts described. Rather, the specific features and acts are disclosed as exemplary forms of implementing the claims. A person skilled in the art once provided with the basic inventive concepts can make changes and modifications to these embodiments within the scope of the present application. Therefore, the appended claims are intended to be interpreted as including both the preferred embodiments and all changes and modifications that fall within the scope of the present application.

What is claimed is:

1. A method for updating a graphic code database, the method comprising:
   receiving a graphic code query request for a graphic code;
   searching product information corresponding to the graphic code in the graphic code database;
   searching whether the graphic code database includes at least one recommended keyword corresponding to the graphic code in response to a determination that the graphic code database does not include product information corresponding to the graphic code;
   in response to a determination that the graphic code database includes the at least one recommended keyword:
      returning one or more recommended keywords to a user device based on the graphic code, and
   in response to a determination that the graphic code database does not includes the at least one recommended keyword:
      receiving one recommended keyword from the user device, and
      associating the one recommended keyword with the graphic code.

2. The method as claimed in claim 1, wherein the returning the at least one recommended keyword corresponding comprises:
   determining a search frequency of each of the at least one recommended keyword corresponding to the graphic code; and
   returning a certain recommended keyword having a search frequency higher than a predetermine value.

3. The method as claimed in claim 1, further comprising:
   determining a search frequency of each of the at least one recommended keyword corresponding to the graphic code;
   selecting, from the at least one recommended keyword, a certain recommended keyword having a search frequency higher than a predetermined value;
   determining product information corresponding to the graphic code according to the at least one selected recommendation keyword; and
   associating the determined product information to the graphic code.

4. The method as claimed in claim 3, wherein the determining the product information corresponding to the graphic code according to the at least one selected recommendation keyword comprises:
   obtaining keyword elements by tokenizing the at least one selected recommended keyword;
   determining an occurrence rate for an individual keyword element of the obtained keyword elements;
   selecting, from the obtained keyword elements, one or more keyword element having an occurrence rate higher than a certain predetermined value;
   determining product information corresponding the one or more selected keyword elements; and
   determining certain product information corresponding to the graphic code based on the product information corresponding the one or more selected keyword elements.

5. The method as claimed in claim 4, further comprising:
   obtaining compounded recommended keywords by combining the one or more selected keyword elements that include multiple selected keyword elements; and
   associating the compounded recommended keywords to the graphic code.

6. The method as claimed in claim 4, wherein the determining the occurrence rate for the each of the obtained keyword element comprises:

determining a number of occurrences of the individual keyword element in the at least one selected recommended keyword; and determining an occurrence rate of the keyword element by computing a ratio between a number of occurrences of the individual keyword element in the at least one selected recommended keyword and a number of the at least one selected recommended keyword.

7. The method as claimed in claim 4, wherein the determining product information corresponding the one or more selected keyword elements comprises:

determining that the individual keyword element of selected keyword element matches with the piece of the product information;

in response to the determination, associating the piece of product information part of the product information corresponding with the selected keyword element.

8. The method as claimed in claim 4, wherein the determining certain product information corresponding to the graphic code based on the product information corresponding the one or more selected keyword elements comprises:

in response to a determination that one piece of product information is determined to correspond to the one or more selected keyword elements, associating the one piece of the product information part of the product information with the graphic code; and in response to a determination that more than one piece of product information are determined to correspond to the selected keyword element:

returning a product information selection request to the user device, the selection request including the more than one piece of product information corresponding to the one or more selected keyword elements, receiving user selected product information from the user device, and associating the user selected product information part of the product information with the graphic code.

9. The method as claimed in claim 1, further comprising:

searching for product information in product information database using a search keyword carried in the search query request;

returning the product information based on the searching;

determining a click rate of a piece of the returned product information during a given period of time; and determining the product information corresponding to the graphic code based on the click rate of the piece of the returned product information.

10. The method as claimed in claim 9, wherein the determining the product information corresponding to the graphic code based on the click rate of the piece of returned product information comprises:

identifying, from the returned product information, pieces of product information having a click rate higher than a predetermined value;

determining that product attribute of identified pieces of product information has a consistent attribute value; and assigning the attribute value as an attribute value of the product information corresponding to the graphic code.

11. The method as claimed in claim 10, further comprising:

identifying, among product attributes of the determined product information corresponding to the graphic code, a product attribute having a blank value;

returning an attribute value adding request to the user device, the attribute value adding request including the determined product information corresponding to the graphic code and an symbol of the product attribute having a blank value;

receiving a user added attribute value for the product attribute having a blank value; and updating the product information corresponding to the graphic code based on the received user added attribute value.

12. An apparatus for updating a graphic code database, the apparatus comprising:

one or more processors; and memory to maintain a plurality of components executable by the one or more processors, the plurality of components comprising:

a graphic code query request receiving unit configured to receive a graphic code query request carrying a graphic code to be searched;

a product information inquiry unit configured to find whether product information corresponding to the graphic code is contained in a graphic code database;

a recommended keyword query unit configured to find, when the product information corresponding to the graphic code is not found in the graphic code database, whether a recommended keyword corresponding to the graphic code is contained in the graphic code database;

a returning unit configured to return the found recommended keyword corresponding to the graphic code, or to return a search box for receiving a search keyword when no recommended keyword corresponding to the graphic code is found.

13. The apparatus of claim 12, further comprising:

a search request receiving unit configured to receive a search request carrying the search keyword, the search keyword being selected from the returned recommended keyword or an input search keyword entered through the search box;

a keyword determining unit configured to determine whether the search keyword matches the recommended keyword corresponding to the graphic code; and a keyword determining and adding unit configured to, when the search keyword is determined to not match the recommended keyword corresponding to the graphic code, making the search keyword a new recommended keyword corresponding to the graphic code, and adding the new recommended keyword to the graphic code database.

14. The apparatus of claim 13, further comprising:

a graphic code query request receiving unit configured to receive a graphic code query request carrying a graphic code to be searched;

a product information lookup unit configured to find, in the updated graphic code database, product information corresponding to the graphic code; and a product information returning unit configured to return product information found by the product information lookup unit.

15. One or more computer-readable media storing computer-executable instructions that, when executed by one or more processors, instruct the one or more processors to perform acts comprising:

receiving a graphic code query request for a graphic code;

searching product information corresponding to the graphic code in the graphic code database;

searching whether the graphic code database includes at least one recommended keyword corresponding to the graphic code in response to a determination that the graphic code database does not include product information corresponding to the graphic code;

in response to a determination that the graphic code database includes the at least one recommended keyword:
    returning one or more recommended keywords to a user device based on the graphic code, and
in response to a determination that the graphic code database does not includes the at least one recommended keyword:
    receiving one recommended keyword from the user device, and
    associating the one recommended keyword with the graphic code.

16. The one or more computer-readable media as claimed in claim 15, wherein the returning the at least one recommended keyword corresponding comprises:
    determining a search frequency of each of the at least one recommended keyword corresponding to the graphic code; and
    returning a certain recommended keyword having a search frequency higher than a predetermine value.

17. The one or more computer-readable media as claimed in claim 15, wherein the acts further comprising:
    determining a search frequency of each of the at least one recommended keyword corresponding to the graphic code;
    selecting, from the at least one recommended keyword, a certain recommended keyword having a search frequency higher than a predetermined value;
    determining product information corresponding to the graphic code according to the at least one selected recommendation keyword; and
    associating the determined product information to the graphic code.

18. The one or more computer-readable media as claimed in claim 17, wherein the determining the product information corresponding to the graphic code according to the at least one selected recommendation keyword comprises:
    obtaining keyword elements by tokenizing the at least one selected recommended keyword;
    determining an occurrence rate for an individual keyword element of the obtained keyword elements;
    selecting, from the obtained keyword elements, one or more keyword element having an occurrence rate higher than a certain predetermined value;
    determining product information corresponding the one or more selected keyword elements; and
    determining certain product information corresponding to the graphic code based on the product information corresponding the one or more selected keyword elements.

19. The one or more computer-readable media as claimed in claim 18, wherein the acts further comprising:
    obtaining compounded recommended keywords by combining the one or more selected keyword elements that include multiple selected keyword elements; and
    associating the compounded recommended keywords to the graphic code.

20. The one or more computer-readable media as claimed in claim 18, wherein the determining the occurrence rate for the each of the obtained keyword element comprises:
    determining a number of occurrences of the individual keyword element in the at least one selected recommended keyword; and
    determining an occurrence rate of the keyword element by computing a ratio between a number of occurrences of the individual keyword element in the at least one selected recommended keyword and a number of the at least one selected recommended keyword.

* * * * *